United States Patent [19]

Logan

[11] 4,039,390
[45] Aug. 2, 1977

[54] FEED SYSTEM FOR PYROLYSIS REACTORS

[75] Inventor: Forrest E. Logan, Claremont, Calif.

[73] Assignee: Occidental Petroleum Corporation, Los Angeles, Calif.

[21] Appl. No.: 683,301

[22] Filed: May 5, 1976

Related U.S. Application Data

[63] Continuation-in-part of Ser. No. 396,752, Sept. 13, 1973, abandoned.

[51] Int. Cl.$^2$ ............................................. C10B 49/22
[52] U.S. Cl. ...................................... 201/12; 201/22; 201/31; 201/36; 202/121; 202/262
[58] Field of Search .................. 201/12, 22, 31, 34, 201/36-38, 32, 40; 202/120, 121, 262; 48/101, 123; 23/288 S; 196/126, 127; 208/127; 165/155, 142; 222/129-131, 146 C; 266/34 L; 138/111, 149, 114, 40, 42, 115, 177, 178

[56] References Cited

U.S. PATENT DOCUMENTS

| | | | |
|---|---|---|---|
| 1,648,856 | 11/1927 | McEwen | 201/31 |
| 2,519,340 | 8/1950 | Bailey | 201/12 |
| 2,709,675 | 5/1955 | Phinney | 201/36 |
| 2,937,988 | 5/1960 | Polack | 208/127 |
| 3,136,705 | 6/1964 | Sommers | 201/31 |
| 3,561,417 | 2/1971 | Downey | 165/155 |

FOREIGN PATENT DOCUMENTS

| | | | |
|---|---|---|---|
| 964,241 | 1/1950 | France | 201/31 |

Primary Examiner—Wilbur L. Bascomb, Jr.
Attorney, Agent, or Firm—Christie, Parker & Hale

[57] ABSTRACT

A pyrolysis reactor has a feed system which includes one or more circularly arcuate feed tubes removably inserted through the outer wall of the reactor. Each feed tube is slidably disposed in a corresponding circularly arcuate external guide sleeve for positioning the discharge end of each feed tube at a predetermined location and orientation within the reactor. A hot particulate material normally suspended in a fluid carrier is fed into the reactor. The inlet end(s) of the feed tube(s) can be connected to a source of particulate agglomerative carbonaceous material suspended in a fluid carrier for injection into the reactor, preferably at a location where the hot particulate material is uniformly distributed throughout the cross-section of the reactor. Means can be provided to cool the particulate agglomerative carbonaceous material during transit through the feed tube(s) to prevent agglomeration in the feed tube(s).

65 Claims, 9 Drawing Figures

FEED SYSTEM FOR PYROLYSIS REACTORS

CROSS-REFERENCE TO RELATED APPLICATION

This is a continuation-in-part of application Ser. No. 396,752, filed Sept. 13, 1973 and now abandoned.

BACKGROUND OF THE INVENTION

This invention relates to a system for feeding carbonaceous materials such as agglomerative coal particles into a pyrolysis reactor.

In a typical process for coal conversion by pyrolysis, coal particles are fed through a feed tube into a pyrolysis reactor. The coal particles typically are suspended in a non-deleteriously reactive fluid carrier, such as nitrogen gas, and are mixed in the reactor with hot char particles at a temperature of about 600° F. or more. The hot char particles are normally suspended in a non-deleteriously reactive carrier fluid, such as nitrogen gas, at about the same temperature. When the coal particles are agglomerative, the fluid carrier must be kept relatively cool prior to injection of the coal particles into the hot stream of char particles to prevent agglomerative plugging of the feed tube.

In the past, agglomerative coal particles have been fed into the hot stream of char particles by connecting the feed tube to the side wall of a curved conduit carrying the stream of char particles to the reactor. The feed tube has been connected along the outside of a bend of the conduit. Excess heating of the coal particles in the feed tube has been avoided because the feed tube terminates at the side wall of the conduit. The feed tube does not extend into the reactor. However, the char particles concentrate around the outside of the bend in the conduit due to centrifugal force. As a consequence, some of the particulate agglomerative material reaches the wall of the reactor before it passes through the agglomerative state. This causes an agglomerative mass to form on the walls of the curved conduit leading to the reactor near or at the attachment of the feed tube to the curved conduit. Thus, the coal particles eventually plug the mouth of the feed tube.

SUMMARY OF THE INVENTION

According to the present invention, carbonaceous materials, such as particulate agglomerative coal in a carrier fluid, is mixed in a pyrolysis reactor with a hot particulate material, typically char in a carrier stream. The carbonaceous material and its carrier fluid are injected into the reactor for rapid distribution into the stream containing the hot particulate material. Injection is accomplished by a circularly arcuate feed tube connected to a source of particulate carbonaceous material and extending through the wall of the pyrolysis reactor. A circularly arcuate sleeve projects outwardly from the wall of the reactor and surrounds the feed tube in a close, slidable, releasable fit to prevent rotation of the feed tube relative to the reactor. The sleeve also controls the extension of the feed tube into the reactor so that the discharge end of the feed tube can be positioned at a predetermined location and in a predetermined orientation within the reactor, typically normal to the reactor axis. This allows the particulate carbonaceous material to be injected into the pyrolysis zone so that the carbonaceous particulate material will be quickly dispersed into the stream of hot particulate material. By way of example, the feed tube can inject the particulate carbonaceous material at a desired location within the reactor, such as a zone where the hot particulate material has become approximately uniformly distributed across the pyrolysis reactor cross-section. This ensures rapid distribution of the particles into the reactor for uniform pyrolysis. In the instance where the carbonaceous material is agglomerative, rapid distribution occurs prior to interparticle agglomeration.

For agglomerative carbonaceous materials, means are provided to maintain the temperature of the particulate agglomerative material in the feed tube below a predetermined temperature such as the agglomeration temperature when the carbonaceous material is agglomerative. Another example is where it is determined to avoid pyrolysis or reaction before the material enters the reactor.

In one form of the invention, a plurality of the circularly arcuate feed tubes are extendible through respective portions of the reactor side wall. The separate feed tubes are slidably disposed in corresponding circularly arcuate guide means for controlling the location and orientation of the discharge end of each feed tube within the reactor. This structure provides high throughput of carbonaceous materials and consistently ensures that the carbonaceous particles will be mixed with the hot particles so that uniform pyrolysis occurs in the reactor.

DRAWINGS

The features of the specific embodiments of the best mode contemplated for carrying out the invention are illustrated in the accompanying drawings, in which.

DETAILED DESCRIPTION

Referring to the drawings, hot particulate material, typically char in a hot stream of a non-deleteriously reactive carrier gas at about 600° F, or more, is fed into a generally upright pyrolysis reactor 10. A source of particulate carbonaceous material, such as bituminous coal suspended in a non-deleteriously reactive carrier gas, such as nitrogen, is also fed into the pyrolysis reactor 10.

Figure 1:
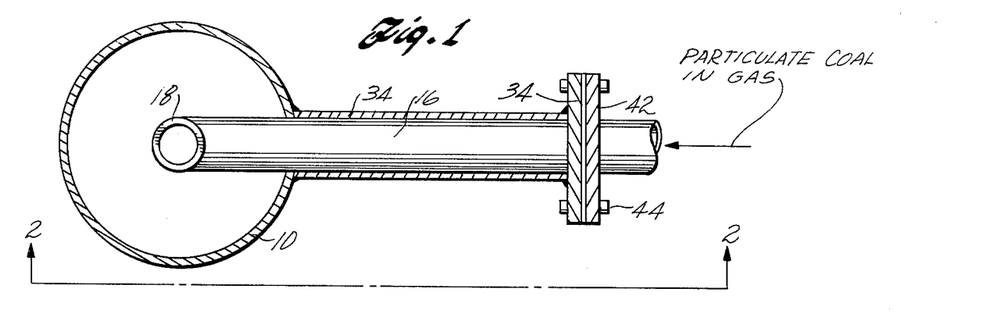
FIG. 1 is a fragmentary top plan view showing a pyrolysis reactor having a feed system according to the principles of this invention.
Figure 2:
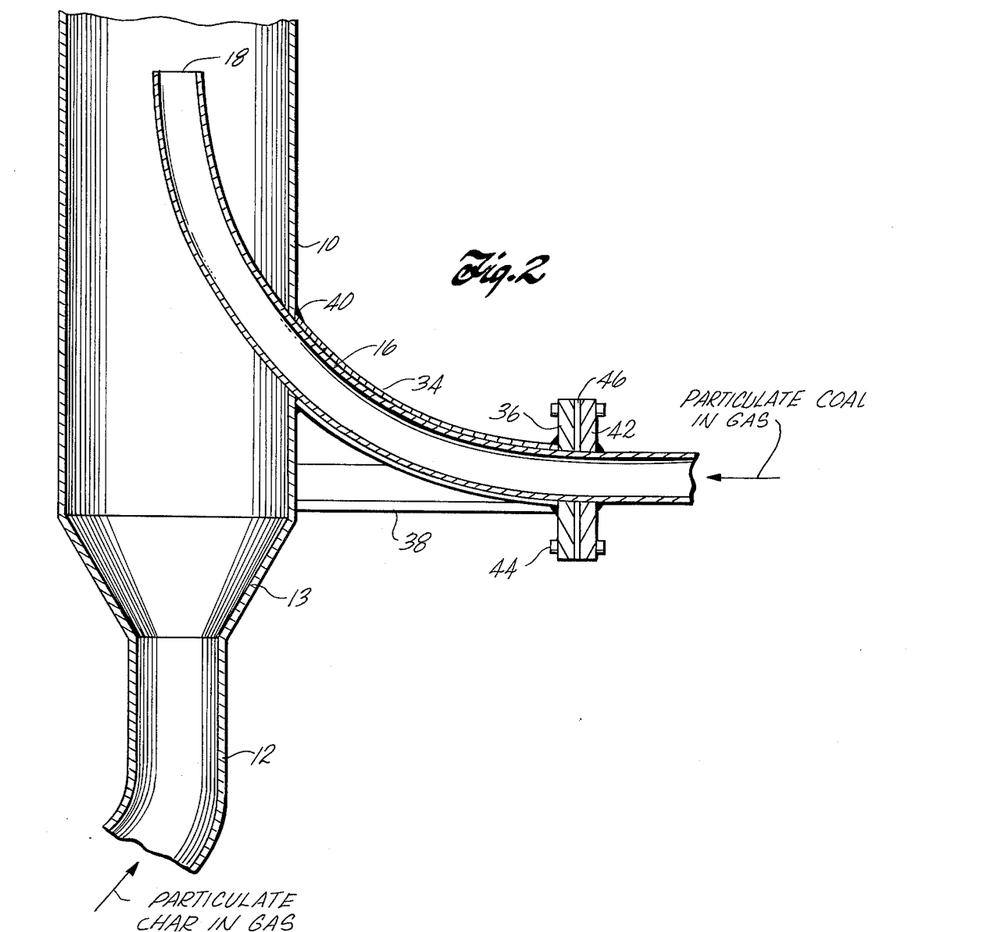
FIG. 2 is a fragmentary front elevation view, partly in cross-section, taken on line 2—2 of FIG. 1.

By a "carbonaceous material" there is meant a solid material such as coal and solid organic residue often solid waste oil shale, tar sands and the like. Coal includes anthracite, agglomerative bituminous coal, sub-bituminous coal, lignite and peat. By the term "non-deleteriously reactive carrier gas" there is meant a gas which is essentially free of oxygen, although the constituents of the gas may react with pyrolysis products to upgrade their value. To be avoided are constituents which degrade pyrolysis products. FIGS. 1 and 2 illustrate a single feed system for the pyrolysis reactor 10; and FIGS. 3 through 5 illustrate the same basic feed system in combination with a system for cooling where necessary the particulate carbonaceous material prior to its injection into the pyrolysis reactor 10.

The stream of hot particulate material, such as a char, enters a curved conduit section 12 from which it passes through a diffusion section 13 and into an elongated section of the pyrolysis reactor 10. The pyrolysis reactor 10 is generally typical to those used for the pyrolysis of coal in the presence of hot particulate char or other inert particulate material.

Figure 3:
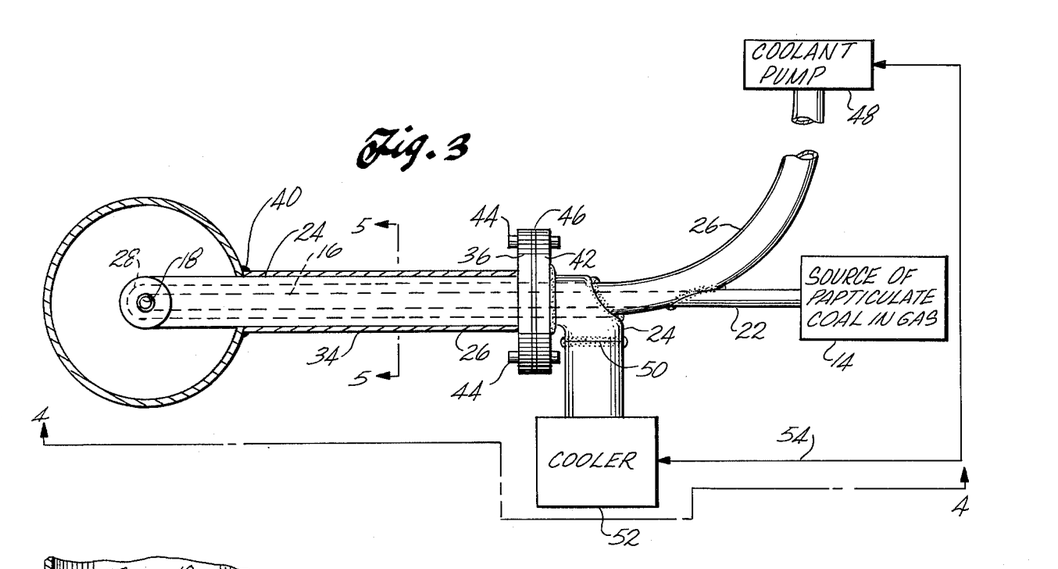
FIG. 3 is a fragmentary, partly schematic, top plan view, partly in cross-section, showing an alternate embodiment of the pyrolysis reactor and feed system of FIGS. 1 and 2.
Figures 4, 5:
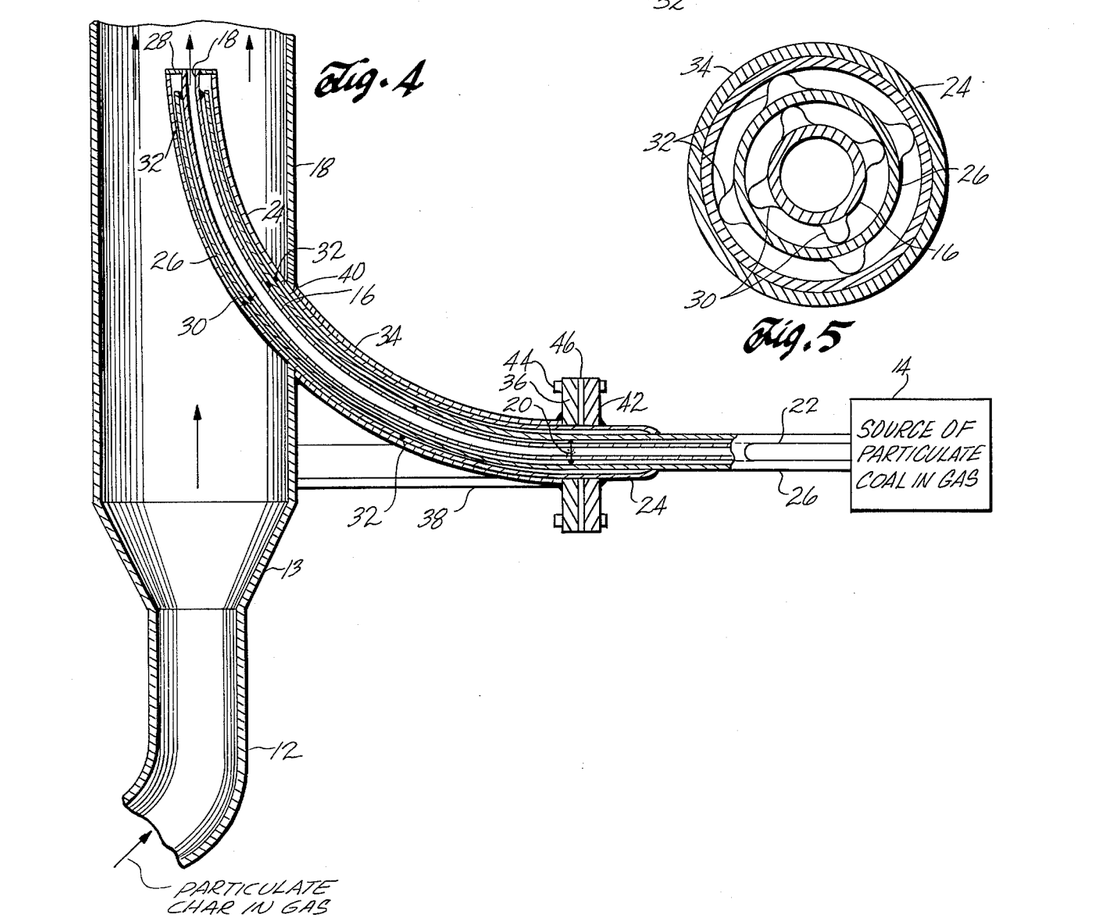
FIG. 4 is a fragmentary, partly schematic, front elevation view, partly in cross-section, taken on line 4—4 of FIG. 3.
FIG. 5 is a cross-sectional view taken on line 5—5 of FIG. 3.

A source of the particulate carbonaceous material suspended in a non-deleteriously reactive carrier gas is represented by a block 14 in FIG. 3. The carbonaceous particles from the source 14 are fed through an elongated feed tube 16 into the interior of the reactor 10. The carrier gas for the coal particles is kept at a substantially lower temperature than the hot particulate material-bearing carrier stream in the conduit 12 to prevent premature pyrolysis and/or agglomeration of the particles in the feed tube 16. The carrier gas for the carbonaceous particles also is maintained at a sufficient pressure to continuously carry the carbonaceous particles into the reactor 10. The carbonaceous particles may be of a nature that at some temperature below the pyrolysis temperature they will begin to swell and secrete tarry constituents which causes closely spaced particles to stick together and agglomerate and to adhere to the walls of the reactor 10 which may require a cooling system as shown in FIGS. 3 through 5. An alternative is to inject the material at a flow rate sufficient to prevent the material from reaching the agglomeration temperature before it exits the feed tube.

The feed tube 16 has a circularly arcuate end section which extends from a location substantially external of the reactor side wall, through the reactor side wall, and into the interior of the reactor 10. This circularly arcuate section of the feed tube 16 has a discharge end 18 preferably located at a point within the reactor 10 which is spaced sufficiently from the entrance to the reactor for the hot particles to be approximately uniformly distributed in their carrier gas across the cross-section of the reactor. In the single feed system shown in FIGS. 1 through 5, the discharge end 18 preferably is located near the centerline reactor 10, and also is located downstream from the inlet of the reactor by a distance equal to four or five times the width or diameter of the reactor. The discharge end 18 of the feed tube 16 also faces downstream away from the entrance to the reactor 10, and preferably injects coal particles into the reactor in a direction substantially parallel to flow path through the reaction 10, i.e., substantially parallel to the longitudinal axis of the reactor 10. Since the feed tube extends a major distance into the reactor 10, the disturbance of the fluid flow caused by the feed tube is minimized. To achieve this, the ratio of the radius of the circularly arcuate section of the feed tube 16 to the inside diameter of the reactor 10 should be at least about 5:1.

In contrast with the present invention, prior feed tubes have been connected to the fluid system along the outside of the bend of the conduit 12, as represented by phantom lines at 12a in FIG. 4, to prevent heating of the particulate coal above its agglomeration temperature prior to injection into the hot char stream. However, the concentration of char particles along the outside of the bend caused by centrifugal force rapidly heats the coal particles at the mouth of the feed tube before they can pass through the agglomerative temperature range, thereby causing the coal particles to agglomerate and eventually plug the mouth of the tube and the curved conduit 12.

The coal particles are kept relatively cool as they are fed to the gas stream containing the hot char in the reactor 10. A variety of alternative systems or methods may be used to cool the coal particles prior to injection into the reactor. In the feed system shown in FIGS. 1 and 2, for example, the coal particles may be fed through the feed tube 16 at such a velocity that the particles are discharged into the reactor 10 before they have time to reach the pyrolysis or agglomeration temperature whichever be the requirement, within the feed tube 16. If the introduction velocity of agglomerative material, for example, is so low that agglomeration can occur in the feed tube, then external means can be used to cool the particles traveling in the feed tube 16 of FIGS. 1 and 2 prior to injection into the reactor. For example, the carrier gas for the coal particles may be cooled, or an isolated coolant fluid such as water, Dowtherm (TM), refrigerated air and the like can be discharged over the portion of the feed tube which extends from the coal source 14 to the reactor 10.

FIGS. 3 through 5 show a jacketed system for cooling the coal particles traveling in the feed tube 16. The feed tube 16 has an end 20 connected to the particulate coal source 14 by a pipe 22. A cooling jacket for the feed tube 16 includes an outer annular sleeve 24 and an elongated inner annular partition 26 concentrically disposed about the feed tube 16. At the discharge end 18 of the feed tube 16, an annular plate 28 closes the conduit 24, while leaving the end of the feed tube 16 open. The inside diameter of the partition 26 is larger than the outside diameter of the feed tube 16. Weld beads 30 support the partition 26 in a position spaced from the feed tube 16 to form an inner flow passage. The inside diameter of the sleeve 24 is larger than the outside diameter of the partition 26. Weld beads 32 support the sleeve 24 in a position spaced from the partition 26 to define an outer flow passage. The partition 26 is spaced from the end plate 28 to permit fluid communication between the inner and outer flow passages at the discharge end 18 of the feed tube 16.

An elongated, circularly arcuate supporting sleeve 34 is secured to the outer wall of the reactor 10. The supporting sleeve 34 extends away from the reactor and surrounds the circularly arcuate portions of the feed tube 16, the partition 26, and the sleeve 24 immediately adjacent the reactor outer wall. The supporting sleeve 34 has a mounting flange 36 at the end of the sleeve remote from the point of attachment of the sleeve to the reactor wall. The sleeve 34 is attached to the reactor 10 by a supporting beam 38 which, as shown, has a T-shaped cross-section that extends transversely from the reactor 10 to a point spaced from the reactor outer wall and located near the flange 36. An external weld joint 40 is formed between the sleeve 34 and the outer wall of the reactor 10 at the point where the feed tube 16 enters the reactor. The weld joint 40 secures the sleeve 36 to the reactor 10 and seals the point of entry of the sleeve 24 into the reactor. A flange 42 on the conduit 24 is secured to the flange 36 by fasteners 44. An O-ring seal 46 is sandwiched between the flanges 36 and 42. The cooling jacket and the feed tube 16 are slidable together as a unit axially relative to the fixed supporting sleeve 34.

To install the feed tube 16 in the reactor 10, the cooling jacket and feed tube 16 are slid lengthwise as a unit through the sleeve 34 until the flange 42 abuts against the flange 36. The stop provided by the abutting flanges determines the extent of penetration of the feed tube 16 into the interior of the reactor 10, and ensures the correct, i.e., location and orientation, of the discharge end 18 within the reactor 10. The feed tube 16, its associated cooling jacket, and the sleeve 34 are of matching circularly arcuate configuration. The feed tube and cooling jacket are circularly arcuate in length at least between the cooling jacket and the feed tube 16 within the reactor. This prevents the discharge end 18 of the feed tube 16 from being rotated away from its correct position in the reactor 10. Thus, the sleeve 34, the external weld joint 40, and the support beam 38 provide for the feed tube 16 and its cooling jacket a means of support and attachment to the reactor 10 that presents no obstructions to the flow path within the reactor 10; and they provide means for positioning the discharge end 18 of the feed tube 16 in a predetermined location and orientation inside the reactor 10 without the feed tube or water jacket being movable lengthwise or rotatable from this preselected position. However, other stop means for properly locating the end of the feed tube within the reactor can be used.

The positioning of the feed tube 16 shown in FIGS. 1 and 2 is substantially identical to that described for FIGS. 3 through 5, except that the feed tube shown in FIGS. 1 and 2 carries the flange 42 and can be connected directly to the source 14 rather than via the separate conduits 22 and 26 shown in FIGS. 3 through 5.

Referring again to the cooling system shown in FIGS. 3 through 5, a coolant, such as water, Dowtherm (TM), refrigerated air and the like is fed to the water jacket by a pump 48 (represented in block form in FIG. 3). The pump 48 is connected to the portion of the partition 26 which extends outside the reactor 10. The coolant is forced by the pump 48 through the inner flow passage of the cooling jacket to the end 18 of the feed tube 16 and from the end of the feed tube through the outer flow passage of the cooling jacket to an exit 50 (shown in FIG. 3). In this manner, the coal particles passing through the feed tube 16 are kept relatively cool as they are fed to the gas stream containing hot char in reactor 10. The temperature of the coolant is sufficiently lower than the hot char in the carrier stream in the reactor 10. Moreover, the flow rate of the coolant is sufficiently high to maintain the temperature within the feed tube 16 below the agglomeration temperature of the coal particles. By connecting the inner flow passage of the cooling jacket to the source of coolant fluid, more effective cooling of the feed tube 16 occurs because the cooler upstream portion of the fluid flowing through the cooling jacket is closer to the feed tube 16, and the downstream portion thereof insulates the upstream portion from the hot environment within the reactor 10, which is typically at a temperature of about 600° F. or more.

If desired, the coolant can be circulated in a closed system. In this instance, a cooler 52 is connected to the exit 50 to return the coolant to its original temperature. The cooler 52 is coupled to the pump 48 by a pipe represented schematically as a line at 54 in FIG. 3.

The source 14 is designed to inject particulate coal and a carrier gas into the feed tube 16 as a dense mass so that the coal and carrier gas travel through the feed tube at approximately the same velocity as the hot carrier stream traveling through the reactor 10. Consequently, the coal particles exit from the discharge end 18 generally at the same velocity as the hot carrier stream traveling through the reactor 10; and the coal particles pass through the agglomerative temperature range before reaching the walls of the reactor.

Two factors minimize agglomeration of coal particles prior to contact with the hot carrier stream in the reactor 10. First, the coal particles are maintained below the agglomeration temperature as they exit from the discharge end 18 by virtue of the cooling jacket shown in FIGS. 3 through 5, or any other desired means for cooling the coal particles; and, second, the coal particles are quickly heated in the hot stream in the reactor 10 to a temperature above the agglomeration temperature before coming into contact with the walls of the reactor 10.

If desired, the pressure of the source 14 can be automatically adjusted to compensate for changes in conditions in the reactor 10. For example, the pressure of the source 14 can be adjusted by a servo system (not shown) responsive to a mass flowmeter (not shown) located in the reactor 10 and a mass flowmeter (not shown) located in the feed tube 16. When the velocity of the hot char-bearing stream traveling through the reactor 10 increases, the velocity of the coal bearing stream traveling through the feed tube 16 also increases, and vice versa. Further, if desired, the flow rate of the coolant forced through the cooling jacket by the pump 48 can be automatically adjusted to compensate for changes in the temperature in the reactor 10. For example, the pump 48 can be adjusted by a servo system responsive to a temperature sensor (not shown) located in the reactor 10 and a temperature sensor (not shown) located in the feed tube 16. When the temperature of the hot carrier stream increases, the flow rate of the water flowing through the cooling jacket also increases, and vice versa. Similar control systems also may be used for other means for cooling the coal particles prior to injection into the reactor 10.

As will be appreciated, the feed tube 16 and its surrounding cooling conduit 24 can be readily removed from the reactor 10 by virtue of the guide means provided by sleeve 34. This can be accomplished without disturbing any insulation or covering surrounding the sleeve 34 or the reactor 10. In addition, withdrawal of the feed tube 16 and the cooling conduit 24 has been found to have only a slight or minimal effect on the flow within the reactor 10.

However, should greater control over flow through the reactor 10 be desired, a plug (not shown) conforming to the sleeve 34, and having an end which conforms to the interior contour of the reactor 10, may be inserted in place of the feed tube 16 and its surrounding cooling conduit. This permits the use of the reactor 10 for other purposes, such as pyrolysis of non-agglomerative carbonaceous materials.

Figure 6:
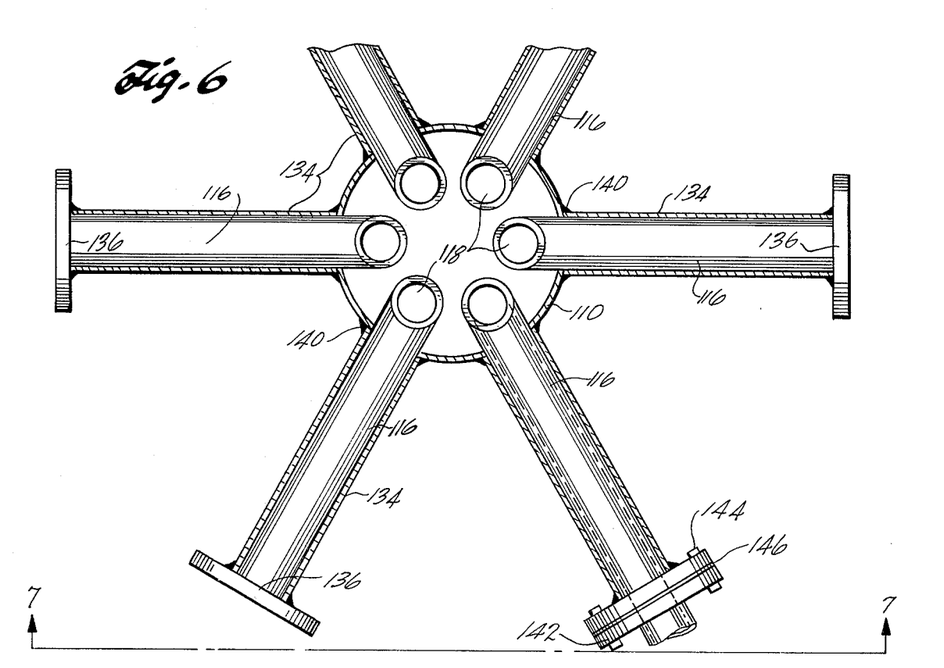
FIG. 6 is a fragmentary top plan view, partly in cross-section, showing a multiple feed system for a pyrolysis reactor.
Figure 7:
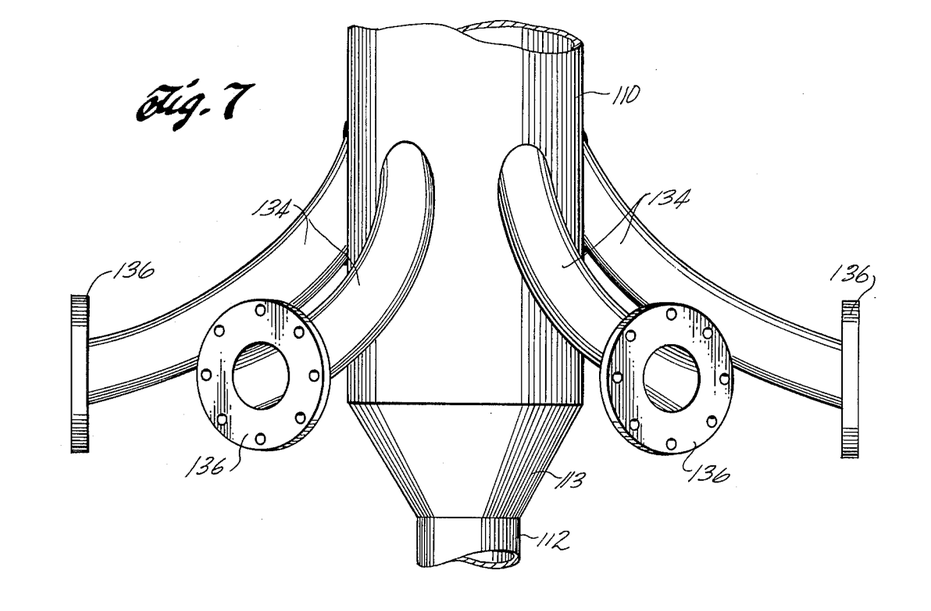
FIG. 7 is a fragmentary front elevation view taken on line 7—7 of FIG. 6.

FIGS. 6 and 7 show an alternate form of the invention in which a pyrolysis reactor 110 has a multiple feed system for the carbonaceous material and carrier gas. The reactor 110 includes a series of circularly arcuate supporting sleeves 134 extending radially away from the outer wall of the reactor 110. The structure of each supporting sleeve 134 is identical to that of the sleeve 34 described above. That is, each sleeve is attached to a corresponding portion of the reactor outer wall by a respective weld joint 140. Each sleeve also may be supported by a corresponding supporting beam (not shown) similar to that of beam 38 described above, or a different supporting arrangement may be used if desired. The end of each supporting sleeve 134 remote from the sleeve's point of attachment to the reactor carries a separate flange 136 similar to the flange 36 described above.

A separate circularly arcuate feed tube 116 is slid lengthwise into each sleeve 134 until the flange 142 carried on each feed tube abuts a corresponding flange 136. This positions the discharge ends 118 of the feed tubes 116 at predetermined locations and orientations within the reactor 110. As shown best in FIG. 6, the discharge ends 118 of the feed tubes 116 are circumferentially spaced apart around the longitudinal axis of the reactor 110. The multiple feed systems couple the reactor to one or more sources of carbonaceous material in any of a variety of configurations. The multiple feed system provides means for substantially increasing the rate of throughput in the reactor relative to a single feed system. The multiple feed system also provides means for efficiently mixing the carbonaceous materials with the stream of hot char particles. To produce desired mixing within the cross-section of the reactor, the ends of the feed tubes 116 may be uniformly oriented within the cross-section of the reactor, as shown in FIG. 7; or other orientations may be used, such as that shown in the alternate multiple feed system illustrated in FIGS. 8 through 9.

In the system shown in FIGS. 8 and 9, a pyrolysis reactor 210 includes a first set of circularly arcuate supporting sleeves 234a extending radially away from opposite sides of the reactor 210; a second set of circularly arcuate sleeves 234b secured to the reactor below the sleeves 234a and extending radially away from opposite sides of the reactor along the same radial extent as the sleeves 234a; and a third set of circularly arcuate sleeves 234c secured to the reactor at the same elevation as the sleeves 234b but extending radially away from the reactor at right angles to the radial extent of the sleeves 234a and 234b. The ends of the sleeves 234a, 234b and 234c remote from their points of connection to the reactor carry corresponding flanges 236a, 236b and 236c, respectively. Each set of sleeves has a different radius of curvature. Separate circularly arcuate feed tubes 216a, 216b, and 216c are extended lengthwise into corresponding ones of the sleeves 234a, 234b, and 234c, respectively. Each feed tube carries a flange which abuts the flange on the feed tube's corresponding sleeve to control the extent and orientation of the feed tubes in the interior of the reactor 210.

Figure 8:
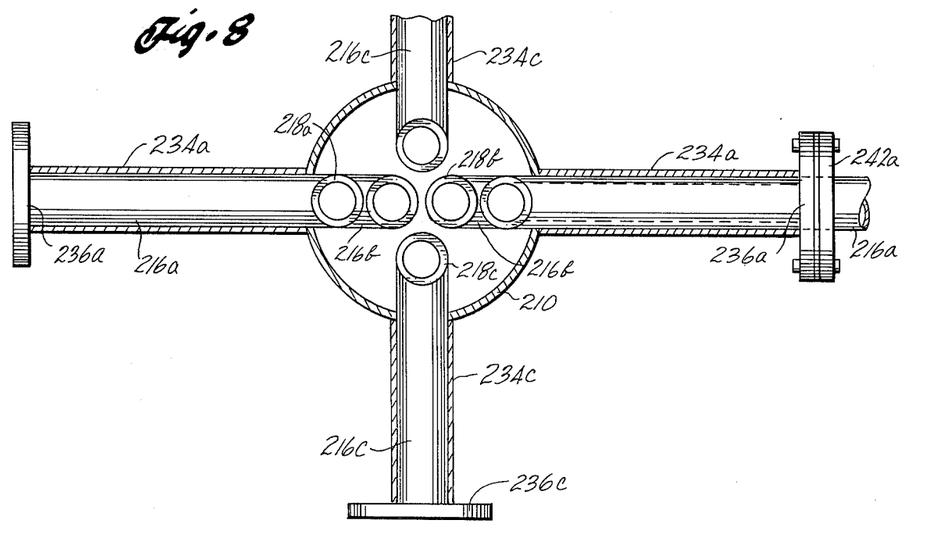
FIG. 8 is a fragmentary top plan view, partly in cross-section, showing an alternate embodiment of a multiple feed system for a pyrolysis reactor.
Figure 9:
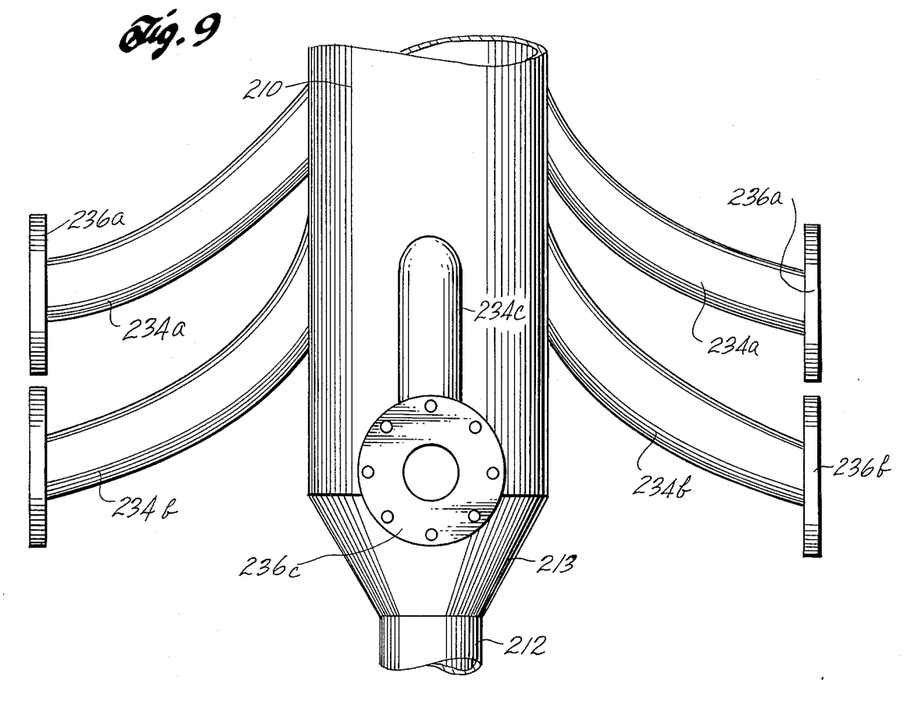
FIG. 9 is a fragmentary front elevation view taken on line 9—9 of FIG. 8.

The feed system shown in FIGS. 8 and 9 illustrates that the discharge ends 218a, 218b, and 218c of the respective feed tubes can terminate at different locations within the cross-sectional area of the reactor 210. Moreover, the discharge ends of the feed tubes can terminate at different locations axially within the reactor 210. Although the feed tubes shown in FIGS. 6 through 9 are illustrated as being circular in cross-section, feed tubes having other cross-sectional configurations also may be used without departing from the scope of the invention. Moreover, the cross-sectional shape of the pyrolysis reactors also is shown as being circular, but other cross-sectional configurations may be used. The multiple feed systems shown in FIGS. 6 through 9 also may be used with any of a variety of means for cooling the carbonaceous material injected into the reactor through the feed tubes.

In summary, the invention provides a feed system for a transport pyrolysis reactor which positions the discharge end(s) of the feed tube(s) at predetermined location(s) within the reactor. This feed system ensures that carbonaceous materials to undergo pyrolysis are introduced into the reactor so that pyrolysis occurs at a desired location and under desired conditions within the reactor.

The feed system can assure, for example, that the carbonaceous materials be introduced into the reactor at a point where the hot char particles are uniformly distributed across the width of the reactor in a manner which minimizes the disturbance of flow of the hot char particles through the reactor and precludes impingement upon the side walls of the reactor, as well as preventing pyrolysis or agglomeration in the feed tube(s). This avoids serious plugging problems.

By making the feed tube circularly arcuate and providing the guide means and stop means to control the extension of the feed tube into the reactor, the discharge end of the feed tube can be automatically positioned "blind" at the precise location and orientation. Since the circularly arcuate sleeve closely fits the feed tube or its surrounding cooling jacket, the arcuate construction prevents rotation of the feed tube in the reactor relative to the side walls of the reactor. This can ensure that the discharge end of the feed tube will always be aligned in a predetermined position. Normally this is along the axis of the reactor to avoid ejecting carbonaceous materials toward the side walls of the reactor. The feed system thus precludes the need for internal inspection and control to always be assured that the feed tube is accurately positioned within the reactor. The feed system also enables the removal of the feed tube from the reactor for repair, cleaning and/or inspection, or the like with positive assurance of correct and quick repositioning in the reactor.

The described embodiments of the invention are only considered to be preferred as illustrative of the inventive concept; the scope of the invention is not to be restricted to only these embodiments. Various and numerous other arrangements may be devised by one skilled in the art without departing from the spirit and scope of this invention.

What is claimed is:

1. In a pyrolysis system including a pyrolysis reactor and a system which transports a flow of hot particulate material suspended in a gaseous carrier of the reactor, an improved system for feeding particulate carbonaceous material into the pyrolysis reactor which comprises:
   a. at least one circularly arcuate feed tube means, a portion which is extendible through an opening in a side wall of the reactor for providing a discharge end positioned in the reactor;
   b. means for coupling an end opposed to the discharge end of the feed tube means to a source of particulate carbonaceous material suspended in a non-deleteriously reactive carrier gas for injection into the reactor;

c. at least one circularly arcuate support sleeve extending outwardly from the external wall of the pyrolysis reactor about an opening therein, said support sleeve receiving said circularly arcuate feed tube means in close slidable relation and preventing rotation of the feed tube means relative to the internal walls of the reactor to cause discharge of carbonaceous material from the feed tube means cocurrent to the flow of hot particulate material within the reactor; and d. means on the support sleeve to control the extension of the feed tube means into the reactor; said feed tube means at least being circularly arcuate from the point of said means on the support sleeve for controlling the extension into the reactor to the discharge end of said feed tube means in the reactor.

2. A pyrolysis system as claimed in claim 1 which includes means for maintaining the particulate carbonaceous material in the feed tube means below a predetermined temperature.

3. A pyrolysis system as claimed in claim 2 in which the feed tube means includes a circularly arcuate feed tube, and means to maintain the carbonaceous material in the feed tube below a predetermined temperature comprising a circularly arcuate cooling jacket included with the feed tube which in combination are insertable within the support sleeve in close slidable relation therewith, and jacket means to receive a supply of coolant fluid to be circulated through the cooling jacket.

4. A pyrolysis system as claimed in claim 3 in which the cooling jacket comprises inner and outer concentric fluid passages communicating with each other at the discharge end of the feed tube, and wherein the coolant fluid is provided from a source connected to the inner passage at an end of the jacket remote from the discharge end of the feed tube, the coolant fluid being removable from an exit connected to the outer passage at the opposed end of the jacket such that coolant fluid flows from the source through the inner passage to the discharge end of the feed tube and from the discharge end of the feed tube through the outer passage to the exit.

5. A pyrolysis system as claimed in claim 1 in which the means to control the extension of the feed tube means comprises abutting flanges respectively on the support sleeve and the feed tube means and seal means positioned between the flanges; and in which a supporting beam extends transversely from the reactor and is secured to the supporting sleeve; and wherein the supporting sleeve is secured to the wall of the reactor by an external weld joint.

6. A pyrolysis system as claimed in claim 3 in which the coolant fluid is water.

7. A pyrolysis system as claimed in claim 1 in which the discharge end of the feed tube means is positioned in the pyrolysis reactor at a point downstream from an inlet of the reactor which is about 4 to 5 times the width of the reactor.

8. A pyrolysis system as claimed in claim 1 in which the ratio of the radius of curvature of the feed tube means to the width of the reactor is at least about 5 to 1.

9. A pyrolysis system as claimed in claim 7 in which the ratio of the radius of curvature of the feed tube means to the width of the reactor is at least about 5 to 1.

10. A pyrolysis system as claimed in claim 1 in which the discharge end of the feed tube means is substantially normal to the longitudinal axis of the reactor, and faces in a downstream position to the direction of flow of the hot particulate material through the reactor.

11. A pyrolysis system as claimed in claim 1 in which the discharge end of the feed tube means terminates within the reactor at a point approximately where the hot particulate material is substantially uniformly distributed throughout the cross-section of the reactor.

12. A pyrolysis system as claimed in claim 1 including a plurality of said circularly arcuate feed tube means each being extendible through a respective opening of the reactor side wall, the separate feed tube means having discharge ends for being located at different positions within the reactor; and each feed tube means having a circularly arcuate support sleeve and means to control the extension, location and orientation of the discharge end of the feed tube means in the reactor.

13. A pyrolysis system as claimed in claim 12 including means coupling an end opposed to the discharge end of each feed tube means to a separate source of particulate agglomerative carbonaceous material suspended in a carrier gas for injection into the reactor.

14. A pyrolysis system as claimed in claim 12 in which the plural feed tube means terminate at a common plane within the reactor.

15. A pyrolysis system as claimed in claim 12 in which the discharge end of each feed tube means is substantially normal to the longitudinal axis of the reactor, and faces in a downstream position to the direction of flow of the hot particles through the reactor.

16. A pyrolysis system comprising:
a. an elongated pyrolysis reactor;
b. means for feeding into an inlet of the reactor a hot particulate material suspended in a carrier fluid at an elevated temperature;
c. at least one circularly arcuate feed tube means having a portion thereof extendng through an opening in a side wall of the reactor and having a discharge end disposed in the reactor and an inlet end positioned outside the reactor;
d. at least one circularly arcuate hollow support sleeve secured to the pyrolysis reactor for receiving the circularly arcuate feed tube in close slidable relation therein to prevent rotation of the feed tube relative to the interior walls of the reactor so as to position the discharge end of the feed tube means at a predetermined location and orientation within the reactor, said feed tube means at least being arcuate from the point of containment by the support sleeve to the extremity of said feed tube means in the reactor;
e. cooperating means on said feed tube means and said support sleeve to limit the extension of said feed tube means into the reactor; and
f. means for feeding a source of particulate carbonaceous material suspended in a carrier fluid to the inlet end of the feed tube means.

17. A pyrolysis system as claimed in claim 16 which includes means for maintaining the temperature of the carbonaceous material in the feed tube means below a predetermined temperature.

18. A pyrolysis reactor as claimed in claim 17 in which the feed tube means includes a circularly arcuate feed tube, and means for maintaining the temperature of the carbonaceous material in the feed tube below a predetermined temperature comprising a circularly arcuate cooling jacket included with the feed tube, which in combination are insertable in the circularly arcuate support sleeve, said combination comprising:

a. a circularly arcuate annular sleeve surrounding the feed tube and being spaced therefrom;
b. an annular plate connecting the annular sleeve to the discharge end of the feed tube;
c. a circularly arcuate annular partition disposed inside said annular sleeve and spaced from said annular plate, said annular sleeve, and said feed tube to define a communicating first coolant flow path between said feed tube and said partition and a second flow path between said partition and said sleeve; and
d. a source of coolant fluid coupled to one of said flow paths near the inlet end of the feed tube and an exit for the coolant fluid coupled to the other flow path.

19. A pyrolysis system as claimed in claim 18 in which the source of coolant fluid is coupled to the first flow path and exits the second flow path.

20. A pyrolysis system as claimed in claim 16 in which the stop means comprise abutting flanges, one carried on the feed tube means and the other carried on the support sleeve.

21. A pyrolysis system as claimed in claim 16 in which the discharge end of the feed tube means is positioned in the pyrolysis reactor at a point downstream from an inlet of the reactor which is about 5 times the width of the reactor.

22. A pyrolysis system as claimed in claim 16 in which the ratio of the radius of curvature of the feed tube means to the width of the reactor is at least about 5 to 1.

23. A pyrolysis system as claimed in claim 16 in which the discharge end of the feed tube means is substantially normal to the longitudinal axis of the pyrolysis reactor, and faces in a downstream position to the direction of flow of the hot particulate material through the reactor.

24. A pyrolysis system as claimed in claim 16 in which the discharge end of the feed tube means terminates within the reactor at a location where the hot particulate material is approximately uniformly distributed throughout the cross-section of the reactor.

25. A pyrolysis system as claimed in claim 16 in which the means for feeding the carbonaceous material to the feed tube means is capable of feeding the carbonaceous material into the reactor at the same velocity as the hot particulate material passing through the reactor to disperse the agglomerative particulate material into the hot particulate material and carrier fluid.

26. A pyrolysis system as claimed in claim 16 including a plurality of said circularly arcuate feed tube means each being extendible through a respective portion of the reactor side wall, the separate feed tube means having discharge ends for being located at different positions within the reactor; and a separate one of said circularly arcuate support sleeves for controlling the location and orientation of the discharge end of each feed tube means within the reactor.

27. A pyrolysis system as claimed in claim 26 including means coupling the end opposed to the discharge end of each feed tube means to a separate source of particulate agglomerative material.

28. A pyrolysis system as claimed in claim 26 in which the plural feed tube means and their corresponding support sleeves have different radii of curvature.

29. A pyrolysis system as claimed in claim 26 in which the discharge end of each feed tube means is substantially normal to the longitudinal axis of the reactor, and each feed tube means faces in a downstream position to the direction of flow of the hot particulate material through the reactor.

30. In a process for the pyrolysis of particulate agglomerative carbonaceous materials in which the particulate agglomerative carbonaceous material is pyrolyzed by combination with a hot particulate material transported by a carrier gas through an elongated section of a transport pyrolysis reactor, the improvement which comprises:
a. inserting at least one removable circularly arcuate feed tube through at least one circularly arcuate sleeve extending outwardly from a side wall of the elongated section of the reactor about an opening therein to position the discharge end of the feed tube at a location upstream of said reactor opening, said arcuate sleeve controlling the extension of the discharge end of the feed tube into the reactor and preventing rotation of the feed tube relative to the internal walls of the reactor; and
b. introducing the carbonaceous material as a suspension in a non-deleteriously reactive carrier gas through the circularly arcuate feed tube for combined flow with the hot particulate material through the portion of the pyrolysis reactor above the discharge end of said feed tube.

31. A process as claimed in claim 30 in which the flow of carbonaceous material in the feed tube is sufficient to maintain the carbonaceous material below a predetermined temperature.

32. A process as claimed in claim 30 including inserting a plurality of said circularly arcuate feed tubes through respective ones of said circularly arcuate sleeves to position the feed tubes at different preselected locations within the cross-section of the reactor.

33. A process as claimed in claim 32 in which flow of the carbonaceous material in the feed tube is sufficient to maintain the carbonaceous material below a predetermined temperature.

34. A process as claimed in claim 30 in which the particulate agglomerative carbonaceous material exits the feed tube at a velocity substantially equal to the velocity of the hot particulate material passing through the reactor to disperse the agglomerative particulate carbonaceous material into the hot particulate and carrier gas.

35. A process as claimed in claim 30 in which the discharge end of the feed tube is positioned in the reactor at a point above the inlet which is about 4 to about 5 times the width of the reactor.

36. A process as claimed in claim 30 including discharging the particulate material from the feed tube at a point in the reactor where the hot particulate material is uniformly distributed across the cross-section of the reactor.

37. A process as claimed in claim 30 in which the carbonaceous material in the feed tube is maintained below a predetermined temperature by flow of a coolant fluid through a circularly arcuate cooling jacket surrounding the feed tube and contained in the supporting sleeve.

38. A process as claimed in claim 37 in which the coolant is water.

39. In a pyrolysis system including a pyrolysis reactor and system which transports a hot particulate material suspended in a gaseous carrier of the reactor, an improved system for feeding particulate agglomerative carbonaceous material into the pyrolysis reactor which comprises:
a. a circularly arcuate feed tube having a portion thereof extendible through a side wall of the reactor for providing a discharge end positioned near the centerline of the reactor at a point approximately uniformly distributed across the width of the reactor;

b. means for coupling an end opposed to the discharge end of the circularly arcuate feed tube to a source of particulate agglomerative carbonaceous material suspended in a carrier gas for injection into the pyrolysis reactor;

c. a cooling jacket surrounding the feed tube;

d. a circularly arcuate support sleeve secured to the wall of the pyrolysis reactor and surrounding at least a portion of the cooling jacket and the feed tube external of the reactor, said sleeve for receiving said cooling jacket and feed tube in close slidable relation and for preventing rotation of the cooling jacket and feed tube relative to the internal walls of the reactor; and means on the support sleeve to control the extension of said cooling jacket and feed tube into the reactor, said circularly arcuate feed tube and cooling jacket at least being arcuate from the location of said control means to the extremity of the cooling jacket and feed tube in the reactor; and e. means for circulating a coolant fluid through said cooling jacket to maintain the temperature of the particulate agglomerative carbonaceous material.

40. A pyrolysis system as claimed in claim 39 in which the cooling jacket comprises inner and outer concentric fluid passages communicating with each other at the discharge end of the feed tube; and wherein the coolant fluid is provided from a source connected to the inner passage at the opposed end of the jacket and is removed from an exit connected to the outer passage at the opposed end of the jacket such that coolant fluid flows from the source through the inner passage to the discharge end of the feed tube and from the discharge end of the feed tube through the outer passage to the exit.

41. A pyrolysis system as claimed in claim 40 in which a portion of the cooling jacket and feed tube extend outside the wall of the pyrolysis reactor through a surrounding semi-circular support sleeve secured to the wall of the pyrolysis reactor, said sleeve having securing means to control the extension of said jacket into the reactor and to prevent rotation of the cooling jacket and feed tube relative to the internal walls of the reactor.

42. A pyrolysis system as claimed in claim 41 in which the securing means comprises abutting flanges, and seal means positioned between the flanges; and in which a supporting beam extends transversely from the reactor and is secured to the sleeve, and wherein the sleeve is secured to the wall of the reactor by an external weld joint.

43. A pyrolysis system as claimed in claim 40 in which the coolant fluid is water.

44. A pyrolysis system as claimed in claim 40 in which the discharge end of the feed tube is positioned in the pyrolysis reactor at a point above the inlet of the pyrolysis reactor which is about 4 to 5 times the width of the pyrolysis reactor.

45. A pyrolysis system as claimed in claim 40 in which the ratio of the radius of curvature of the feed tube to the width of the pyrolysis reactor is at least about 5 to 1.

46. A pyrolysis system as claimed in claim 44 in which the ratio of the radius of curvature of the feed tube to the width of the pyrolysis reactor is at least about 5 to 1.

47. A pyrolysis system as claimed in claim 40 in which the end of the feed tube is substantially parallel to the longitudinal axis of the pyrolysis reactor.

48. A pyrolysis system as claimed in claim 44 in which the end of the feed tube is substantially parallel to the longitudinal axis of the pyrolysis reactor.

49. A pyrolysis system comprising:

a. an elongated pyrolysis reactor;

b. means to feed a hot particulate material into the inlet of the pyrolysis reactor suspended in a carrier fluid at an elevated temperature;

c. a circularly arcuate feed tube having a portion thereof extending through a side wall of the reactor and having a discharge end and an inlet end, the discharge end being disposed in the reactor at approximately the centerline thereof and at a point where the hot particulate material is approximately uniformly distributed across the width of the reactor, the inlet end of the feed tube being positioned outside the reactor;

d. a circularly arcuate hollow support sleeve secured to the pyrolysis reactor, said sleeve being adapted to receive the circularly arcuate feed tube in close slidable relation to prevent rotation of the feed tube relative to the interior wall of the reactor and to position the discharge end of the feed tube axially with respect to the centerline thereof;

e. means on said support sleeve to control the extension of said feed tube into the reactor, said circularly arcuate feed tube at least being arcuate from the location of the control means to the extremity of the feed tube in the reactor;

f. means to feed a source of agglomerative particulate carbonaceous material suspended in a carrier fluid to the inlet end of the feed tube, said means being capable of feeding the agglomerative particulate carbonaceous material into the reactor at the same velocity as the hot particulate material passing through the reactor to disperse the agglomerative particulate into the hot particulate material and carrier fluid; and g. means for maintaining the temperature of the feed tube below the agglomeration temperature of the agglomerative particulate carbonaceous material.

50. A pyrolysis system as claimed in claim 49 in which the means for controlling temperature in the feed tube is a cooling jacket surrounding the feed tube, a portion of which is contained in the circularly arcuate support sleeve and which comprises:

a. a circularly arcuate annular sleeve surrounding the feed tube and spaced therefrom;

b. an annular plate connecting the annular sleeve to the discharge end of the feed tube;

c. a circularly arcuate annular partition disposed inside said sleeve and spaced from said annular plate, said sleeve, and said feed tube to define a communicating first coolant flow path between said feed tube and said partition and a second flow path between said partition and said sleeve; and d. a source of coolant fluid coupled to one of said flow paths near the inlet end of the feed tube and an exit for the coolant fluid coupled to the other flow path.

51. A pyrolysis system as claimed in claim 50 in which the source of coolant fluid is coupled to the inner flow path and exits the outer flow path.

52. A pyrolysis system as claimed in claim 50 in which the cooling fluid is water.

53. A pyrolysis system as claimed in claim 51 in which the cooling fluid is water.

54. A pyrolysis system as claimed in claim 50 in which the circularly arcuate supporting sleeve surrounds the portion of the cooling jacket and feed tube outside the pyrolysis reactor, said supporting sleeve being connected to the outer wall of the pyrolysis reactor by an external weld joint; and wherein said supporting sleeve provides means for limiting the extension of said feed tube and cooling jacket into the reactor.

55. A pyrolysis system as claimed in claim 51 in which the said means for limiting the extension of said feed tube and cooling jacket into the pyrolysis reactor comprises abutting flanges and seal means between the flanges.

56. A pyrolysis system as claimed in claim 49 in which the discharge end of the feed tube is positioned in the pyrolysis reactor at a point above the inlet of the pyrolysis reactor which is about 4 to 5 times the width of the pyrolysis reactor.

57. A pyrolysis system as claimed in claim 49 in which the ratio of the radius of curvature of the feed tube to the width of the pyrolysis reactor is at least about 5 to 1.

58. A pyrolysis system as claimed in claim 56 in which the ratio of the radius of curvature of the feed tube to the width of the pyrolysis reactor is at least about 5 to 1.

59. A pyrolysis system as claimed in claim 49 in which the discharge end of the feed tube is substantially parallel to the longitudinal axis of the pyrolysis reactor.

60. A pyrolysis system as claimed in claim 50 in which the discharge end of the feed tube is substantially parallel to the longitudinal axis of the pyrolysis reactor.

61. A pyrolysis system as claimed in claim 56 in which the discharge end of the feed tube is substantially parallel to the longitudinal axis of the pyrolysis reactor.

62. In a process for the pyrolysis of particulate agglomerative carbonaceous materials in which the particulate agglomerative carbonaceous material is pyrolyzed by combination with a hot particulate material transported through an elongated section of a transport pyrolysis reactor by a carrier gas, the improvement which comprises:
  a. inserting through a circularly arcuate sleeve secured to a side wall of the elongated section of the pyrolysis reactor about an opening therein a closely fitting, removable, circularly arcuate feed tube and circularly arcuate surrounding cooling jacket to position the discharge end of the feed tube at approximately the center of the reactor in a plane approximately normal to the axis of the reactor, the position of the discharge end being upstream of said opening and at a point where the hot particulate material is uniformly distributed across the reactor, said sleeve controlling the extension of the discharge end of the feed tube into the reactor and preventing rotation of the cooling jacket and feed tube relative to the internal walls of the reactor;
  b. passing a coolant fluid through the cooling jacket to maintain the interior of the feed tube below the agglomeration temperature of the carbonaceous material while introducing the carbonaceous material as a suspension in an inert carrier gas through the circularly arcuate feed tube for combined flow with the hot particulate material through the portion of the pyrolysis reactor above the discharge end of said feed tube.

63. A process as claimed in claim 62 in which the particulate agglomerate carbonaceous material exits the feed tube at a velocity substantially equal to the velocity of the hot particulate material passing through the reactor to disperse the agglomerative particulate carbonaceous material into the hot particulate material and carrier gas.

64. A process as claimed in claim 62 in which the cooling fluid is water.

65. A process as claimed in claim 63 in which the discharge end of the feed tube is positioned in the pyrolysis reactor at a point above the inlet which is about 4 to 5 times the width of the pyrolysis reactor.

* * * * *

UNITED STATES PATENT AND TRADEMARK OFFICE
CERTIFICATE OF CORRECTION

PATENT NO. : 4,039,390
DATED : August 2, 1977
INVENTOR(S) : FORREST E. LOGAN

It is certified that error appears in the above-identified patent and that said Letters Patent are hereby corrected as shown below:

Column 3, line 5, after "of" insert -- free --; line 61, for "reaction" read -- reactor --. Column 10, line 36, for "extendng" read -- extending --. Column 12, line 42, after "particulate" insert -- material --. Column 14, line 26, for "wall" read -- walls --. Column 16, line 40, before "5" insert -- about --.

Signed and Sealed this

Twenty-fourth Day of January 1978

[SEAL]

Attest:

RUTH C. MASON
Attesting Officer

LUTRELLE F. PARKER
Acting Commissioner of Patents and Trademarks